United States Patent
Cassell

(10) Patent No.: US 10,710,650 B2
(45) Date of Patent: Jul. 14, 2020

(54) SPARE TIRE HOLDER

(71) Applicant: Shannon Cassell, Easley, SC (US)

(72) Inventor: Shannon Cassell, Easley, SC (US)

( * ) Notice: Subject to any disclaimer, the term of this patent is extended or adjusted under 35 U.S.C. 154(b) by 33 days.

(21) Appl. No.: 15/991,113

(22) Filed: May 29, 2018

(65) Prior Publication Data

US 2019/0054963 A1    Feb. 21, 2019

Related U.S. Application Data

(60) Provisional application No. 62/546,909, filed on Aug. 17, 2017.

(51) Int. Cl.
| | | |
|---|---|---|
| *B62D 43/06* | (2006.01) | |
| *B60R 9/06* | (2006.01) | |
| *B62D 33/02* | (2006.01) | |
| *B62D 43/02* | (2006.01) | |

(52) U.S. Cl.
CPC ............ *B62D 43/06* (2013.01); *B60R 9/06* (2013.01); *B62D 33/02* (2013.01); *B62D 33/0207* (2013.01); *B62D 43/02* (2013.01)

(58) Field of Classification Search
CPC .... B62D 43/06; B62D 33/02; B62D 33/0207; B62D 43/02; B60R 9/06
USPC ........................................................ 224/403
See application file for complete search history.

(56) References Cited

U.S. PATENT DOCUMENTS

| | | | | |
|---|---|---|---|---|
| 1,866,013 A * | 7/1932 | Coquille | ................ | B62D 43/02 224/42.13 |
| 2,809,496 A * | 10/1957 | Geil | ..................... | B60P 3/1058 280/414.1 |
| 3,229,838 A * | 1/1966 | Johnson | .................... | B60P 3/10 414/462 |
| 3,343,736 A | 9/1967 | Sellers | | |
| 3,598,296 A * | 8/1971 | Gostomski | ............. | B62D 43/02 224/506 |
| 3,610,658 A * | 10/1971 | Sartori | ...................... | B60R 3/02 280/164.1 |
| 4,483,468 A | 11/1984 | Lucas | | |
| 4,485,945 A | 12/1984 | Snkeny | | |
| 5,183,192 A * | 2/1993 | Mrozowski | ............ | B62D 43/02 224/42.21 |
| 5,186,371 A * | 2/1993 | Jozefczak | ............ | B62D 43/002 224/42.21 |
| 5,197,642 A * | 3/1993 | Cortelli | ..................... | B60P 7/15 224/310 |
| 5,370,285 A | 12/1994 | Steelman | | |
| 5,505,579 A * | 4/1996 | Ray | ....................... | B60P 3/1025 224/310 |
| 5,730,338 A * | 3/1998 | Travis | .................... | B62D 43/02 224/401 |
| 6,834,786 B2 * | 12/2004 | Hansen | .................. | B60P 3/122 211/20 |
| 9,248,784 B2 * | 2/2016 | Kraeuter | .................. | B60P 3/40 |
| 9,828,045 B1 * | 11/2017 | Harris | ................. | B62D 43/002 |

(Continued)

*Primary Examiner* — Nathan J Newhouse
*Assistant Examiner* — Lester L Vanterpool
(74) *Attorney, Agent, or Firm* — J. Bennett Mullinax, LLC

(57) ABSTRACT

This present invention relates to a spare tire mount on a vehicle, particularly for use on pick-up trucks and similar vehicles having an open cargo area. More particularly, the present invention relates to a spare tire mount which is held at an angle within a cargo bed area of a pick-up truck in which can be moved to an elevated position to allow for greater utilization of the cargo area of a pick-up truck.

10 Claims, 12 Drawing Sheets

(56) References Cited

U.S. PATENT DOCUMENTS

| | | | |
|---|---|---|---|
| 2004/0134953 A1* | 7/2004 | Perez | B60P 3/40 |
| | | | 224/403 |
| 2005/0095103 A1* | 5/2005 | Wooten | B62D 43/002 |
| | | | 414/463 |
| 2006/0091167 A1* | 5/2006 | Bishop | B60R 9/06 |
| | | | 224/42.21 |
| 2007/0034655 A1* | 2/2007 | Storer | B60R 9/00 |
| | | | 224/403 |
| 2014/0263113 A1* | 9/2014 | Hall, II | A47B 81/005 |
| | | | 211/70.8 |

* cited by examiner

SPARE TIRE HOLDER

RELATED APPLICATIONS

This application claims the benefit of U.S. Application Ser. No. 62/546,909 entitled "A Repositionable Device Used to Hold A Wheel and Tire At An Angle In The Bed Of A Pick-up Truck filed on Aug. 17, 2017 and which is incorporated herein by reference.

FIELD OF THE INVENTION

This present invention relates to a spare tire mount on a vehicle, particularly for use on pick-up trucks and similar vehicles having an open cargo area. More particularly, the present invention relates to a spare tire mount which is held at an angle within a cargo bed area of a pick-up truck in which can be moved to an elevated position to allow for greater utilization of the cargo area of a pick-up truck.

BACKGROUND OF THE INVENTION

This invention relates generally to various types of spare tire mounting mechanisms for use with a pick-up truck. Frequently, a spare tire is mounted under a pick-up truck bed which is difficult to access and remove. It is additionally known to mount a spare tire vertically on a tailgate or on a trailer hitch of a pick-up truck.

U.S. Pat. No. 5,370,285 to Steelman describes a spare tire rack that is pivotally mounted onto a telescopic hitch mechanism.

U.S. Pat. No. 4,485,945 to Ankemy describes a spare tire mounting apparatus that is pivotally attached to the bumper of a pick-up truck and which will swing down when the tailgate of a pick-up is opened.

U.S. Pat. No. 3,343,736 to Sellers provides for a spare tire mounting apparatus having a base that is mounted on the bumper of a vehicle. A tubular body is pivotally attached to the base and can be positioned between vertical and horizontal positions.

U.S. Pat. No. 4,483,468 to Lucas provides for a spare tire carrier having a frame member that is designed to nest within a bumper of the vehicle. A tire mounting apparatus includes a moveable arm attached to the frame by a pivot point.

Accordingly, there remains room for improvement and variation within the art.

SUMMARY OF THE INVENTION

It is one aspect of at least one of the present embodiments to provide for a mounting system for a spare tire that positions the spare tire within a cargo area of a pick-up truck, the spare tire carrier being adapted for being pivoted, slid, or repositioned in an upward direction such that the spare tire is above the truck bed and allows for greater access and utilization of the truck bed cargo space.

It is a further aspect of at least one embodiment of the present invention to provide for a spare tire mounting apparatus for use within the bed of a pick-up truck in which the spare tire is secured along a support rod that allows the spare tire to be lifted away from the cargo bed by engagement of the support rod with an additional support rod, the additional support rod being secured to opposite sidewalls of a cargo bed of a pick-up truck.

It is a further aspect of at least one embodiment from the present invention to provide for a spare tire holder that positions a spare tire within a cargo area of a pick-up truck and in an angled position which further includes a wheeled support that facilitates the removal of the spare tire from the cargo bed when the spare tire is needed.

It is a further aspect of at least one embodiment of the present invention to provide for a spare tire holder for use within a cargo area of a pick-up truck comprising: a first support rod having a first end and a second end, the first end and the second end adapted for securing to opposite walls of a cargo area of a pick-up truck; a second support rod having a first end and a second end, the second support rod first end secured to the first support rod, along a front end a second end of the second support rod carrying a wheel; at least one attachment member secured to the second support rod, the at least one attachment member adapted for holding a spare tire thereto; wherein, when the first support rod is in a horizontal configuration, the second support rod can be elevated from a first position having the wheel adjacent a floor of the cargo area to a second position wherein the second support rod and said wheel is positioned above a cargo area of the pick-up truck bed.

It is a further aspect of this invention to provide a process of storing a spare tire within a cargo area of a pick-up truck comprising: providing a first support rod having a first end and a second end, the first end and the second end adapted for securing to opposite walls of a cargo area of a pick-up truck;

a second support rod having a first end and a second end, the second support rod first end secured to the first support rod, along a front end a second end of the second support rod carrying a wheel; at least one attachment member secured to the second support rod, the at least one attachment member adapted for holding a spare tire thereto; attaching a spare tire to the second support rod said spare tire, said support rod defining a stored position where the tire is maintained in a non-horizontal plane relative to a floor of the truck bed; raising the second rod and the spare tire to a second supported position, said second supported position being above a cargo area of the pick-up truck.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
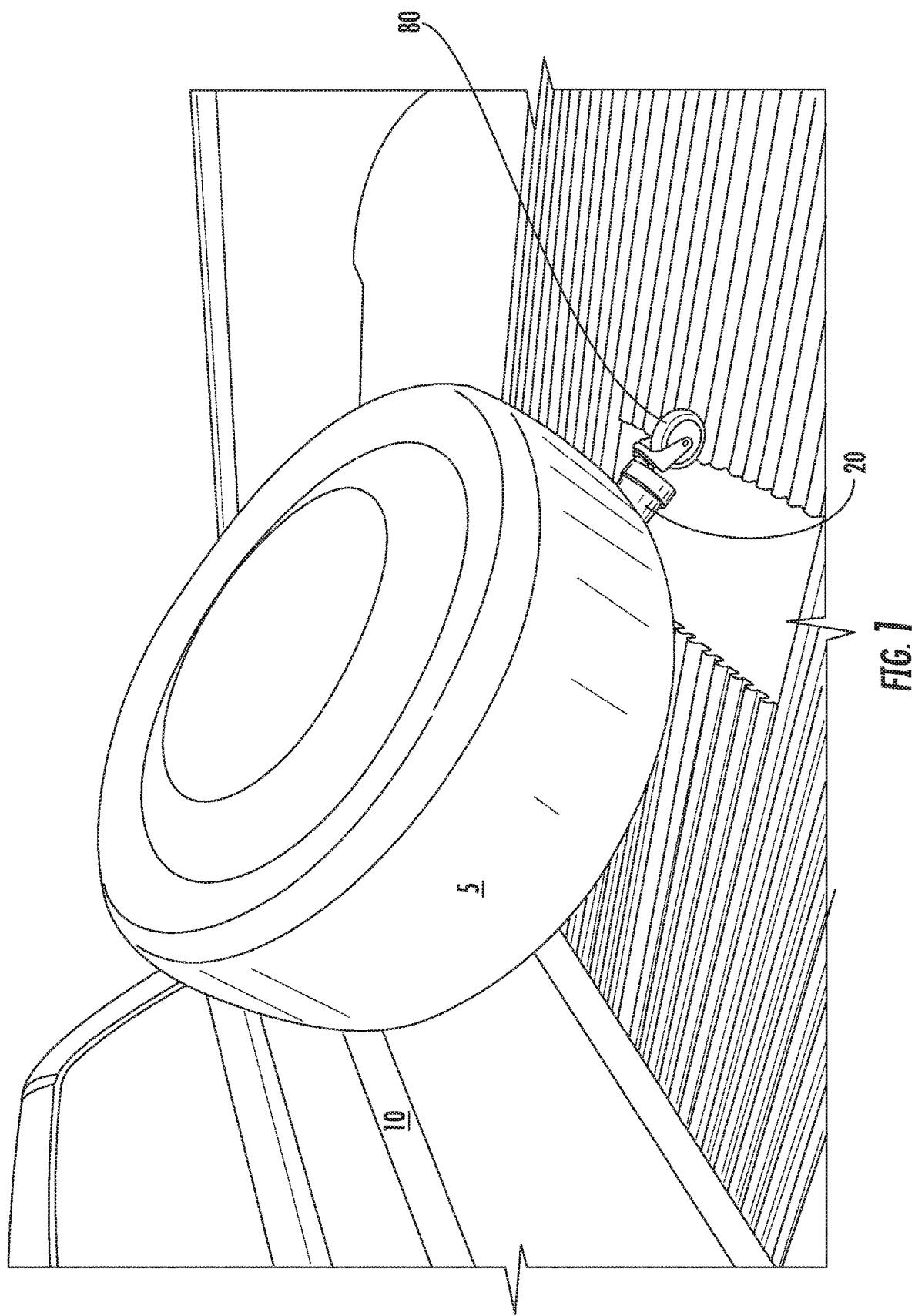
FIG. 1 is a side perspective view of a spare tire holder illustrating a spare tire mounted thereto in a stored position.
Figure 3:
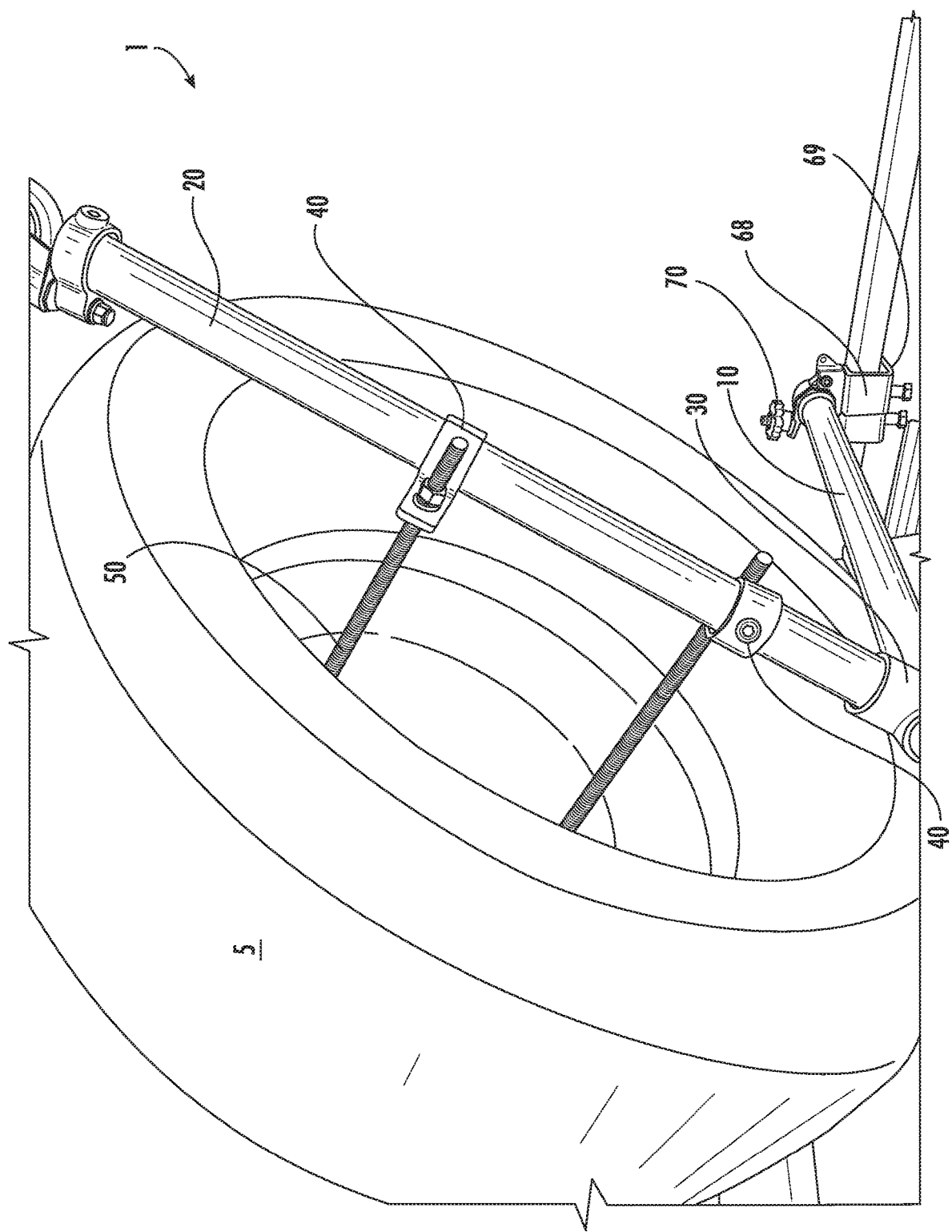
FIG. 3 is a side perspective view of a spare tire holder in an elevated position.
Figure 4:
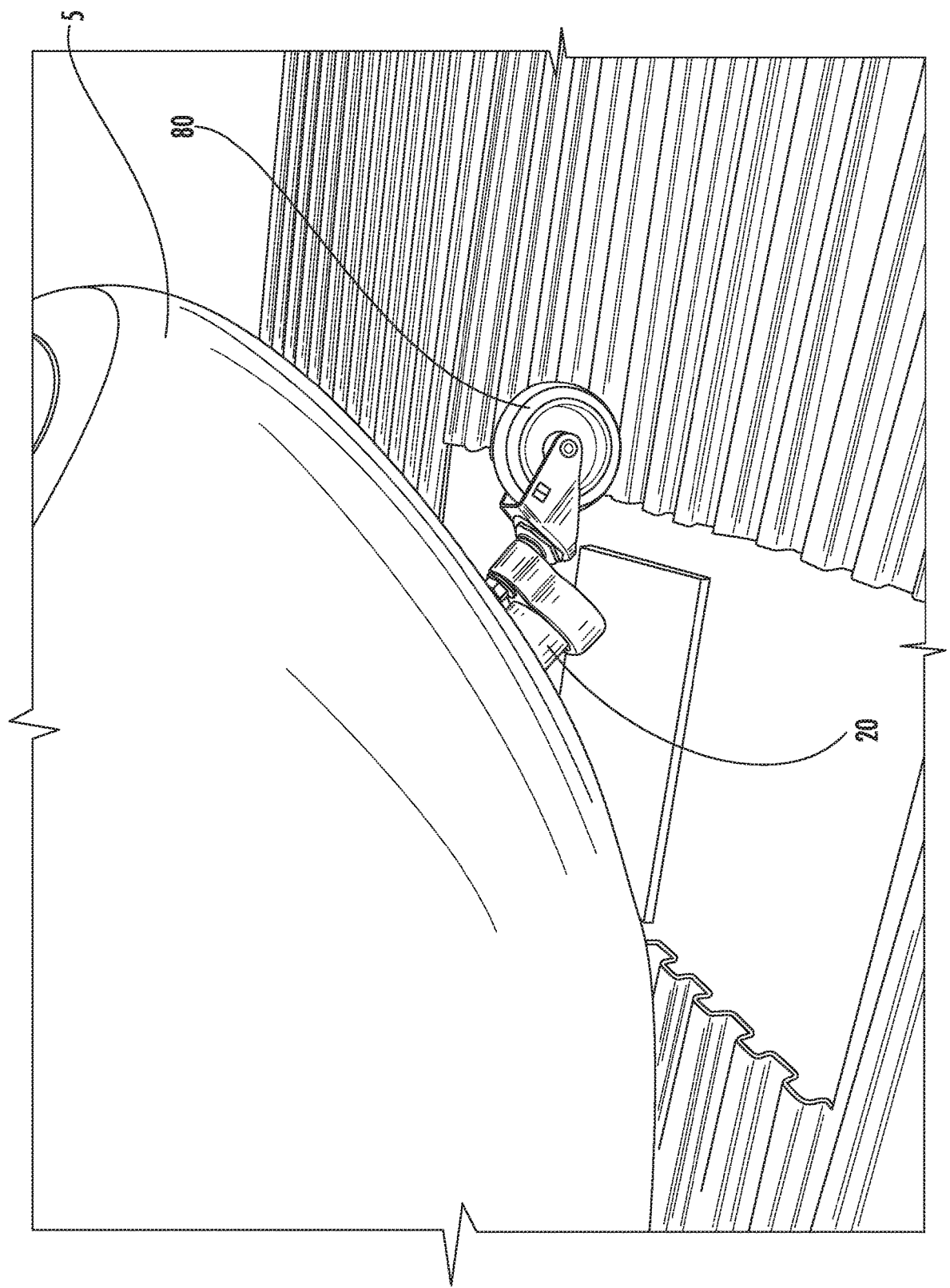
FIG. 4 is a side perspective view showing details of a wheeled base that supports the spare tire holder in a first position when engaged within the bed of a pick-up truck.
Figure 7:
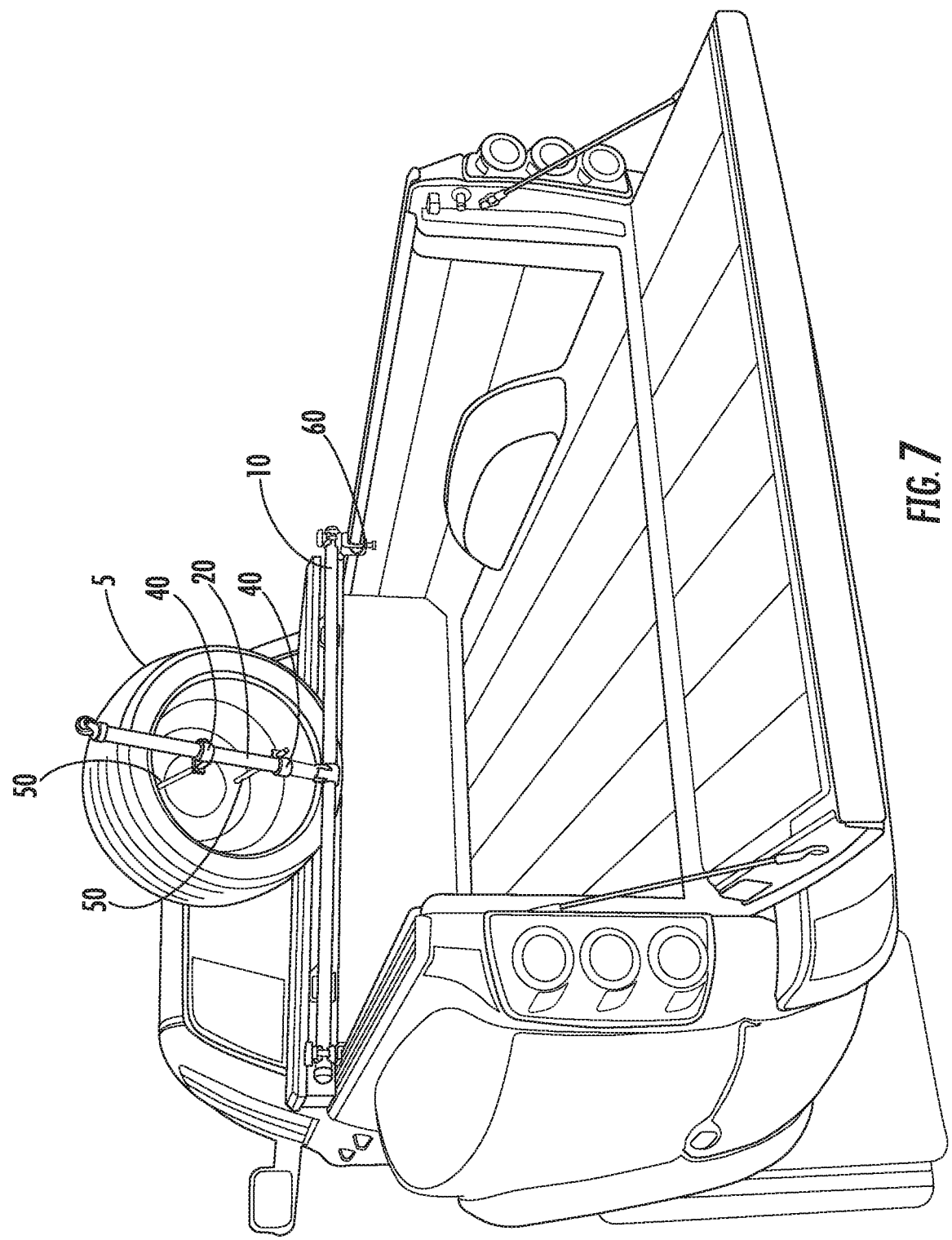
FIG. 7 is a perspective view of the spare tire holder having a tire and wheel attached thereto in an elevated position which provides greater access to a cargo area of a pick-up truck.

As best seen in reference to FIGS. 1, 3, and 7, a spare tire holder 1 is provided which is adapted for holding a wheel/tire combination (spare tire) 5 within a bed or cargo area of a pick-up truck. As used herein, the term "cargo area" refers to the volume of space between the truck bed and the dimensions defined by the side walls of the truck bed.

As seen in reference to FIG. 1, a spare tire 5 is in a stored position within a cargo area of a pick-up truck bed. As best seen in reference to FIGS. 3 and 7, the spare tire 5 is secured to a rod 20, rod 20 supporting a wheel 80 along a terminal end of rod 20, the wheel 80 adapted to engage floor of the pick-up truck bed. As illustrated, the spare tire in a stored configuration is positioned in a non-horizontal plane in reference to the truck bed.

Rod 20 is connected to rod 10 which extends horizontally between the side walls of the truck bed. Rod 20 is connected to rod 10 using a tee pipe fitting 30. Rod 20 furthers supports one or more brackets 40 which defines apertures for receiving threaded screws 50 that are conventionally used to secure a spare tire to a support structure. Brackets 40 can be adjusted to be placed in a desired position on the rod 20 and may be secured to rod 20 using a set screw.

Horizontal support rod 10 can be positioned in a variety of ways to the side walls of a pick-up truck. In some embodiments, the rod can be connected to clips or opening that are provided as part of the manufacture's construction of the side wall. In the illustrated embodiments, a pair of opposing clamps 60 are used which attach to the upper section of the side walls and which further define a pivoting arm 66 that engages and applies a desired amount of pressure to rod 10. Clamp 60 will hold the rod 20 in a secured position yet still allow rotation of the rod 10 relative to clamp 60 thereby allowing the spare tire 5 and rod 20 to be moved between a stored position as seen in FIG. 1 and to an elevated position as seen in FIG. 7.

As used herein, the term "Rod" includes any substantially rigid material that can be used to support and engage the spare tire holder and components. Accordingly, tubular rods, pipes, rectangular tubing, solid metal supports, and similar materials can be utilized and fall within the definition of "Rod".

Figure 5:
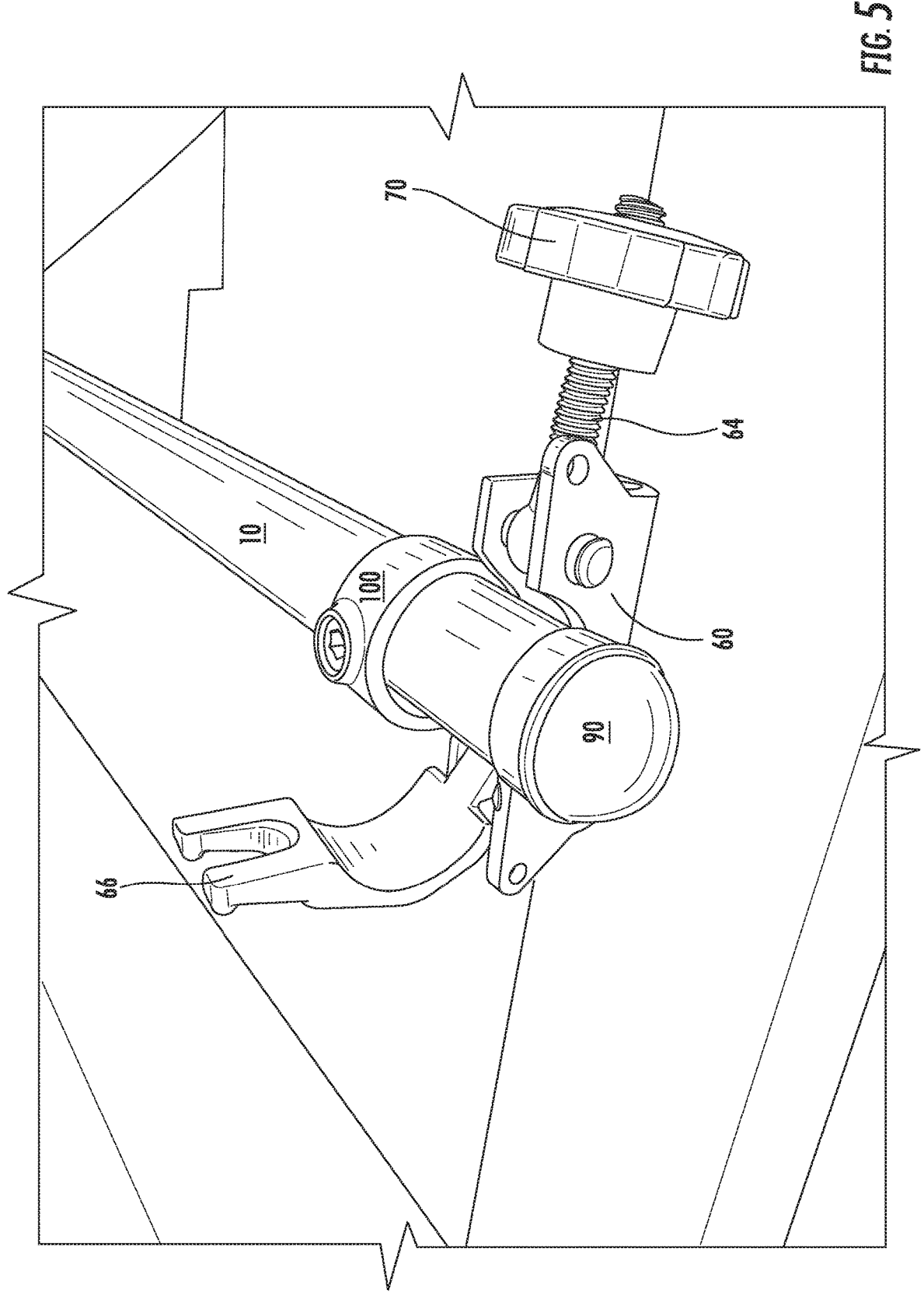
FIGS. 5 and 6 are perspective views setting forth details of a clamp for securing a first rod to a side wall of a cargo area of a pick-up truck.
Figure 6:
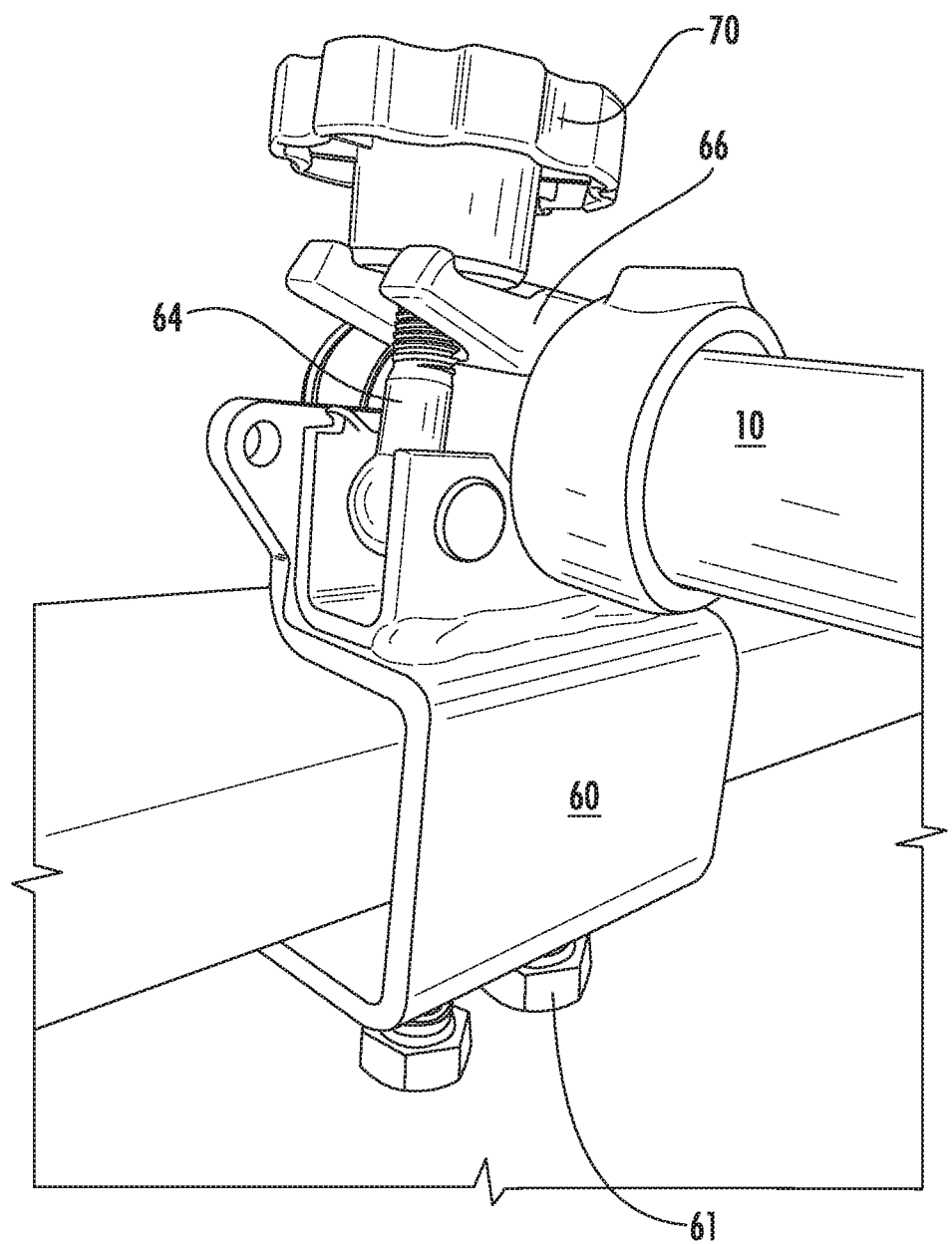

As seen in reference to FIGS. 5 and 6, clamp 60 has a U-shaped member that will engage the side wall of a pick-up truck bed. One or more set screws 61 can be used to secure the clamp 60 to the truck side wall. A threaded bolt 64 is pivotally attached to the clamp 60 and can be positioned to engage a pronged end of a pivoting arm 66 which is also pivotally carried by the clamp 60. As seen in FIG. 6, when bolt 64 is positioned within arm 66, a handle 70 can be used to apply downwardly directed pressure by the threaded engagement of the handle 70 to the bolt 64 via arm 66. The variable pressure between the handle 70 and the bolt 64 allows the tension supplied by the clamp 60 to the rod 10 to be varied as needed.

Figure 2:
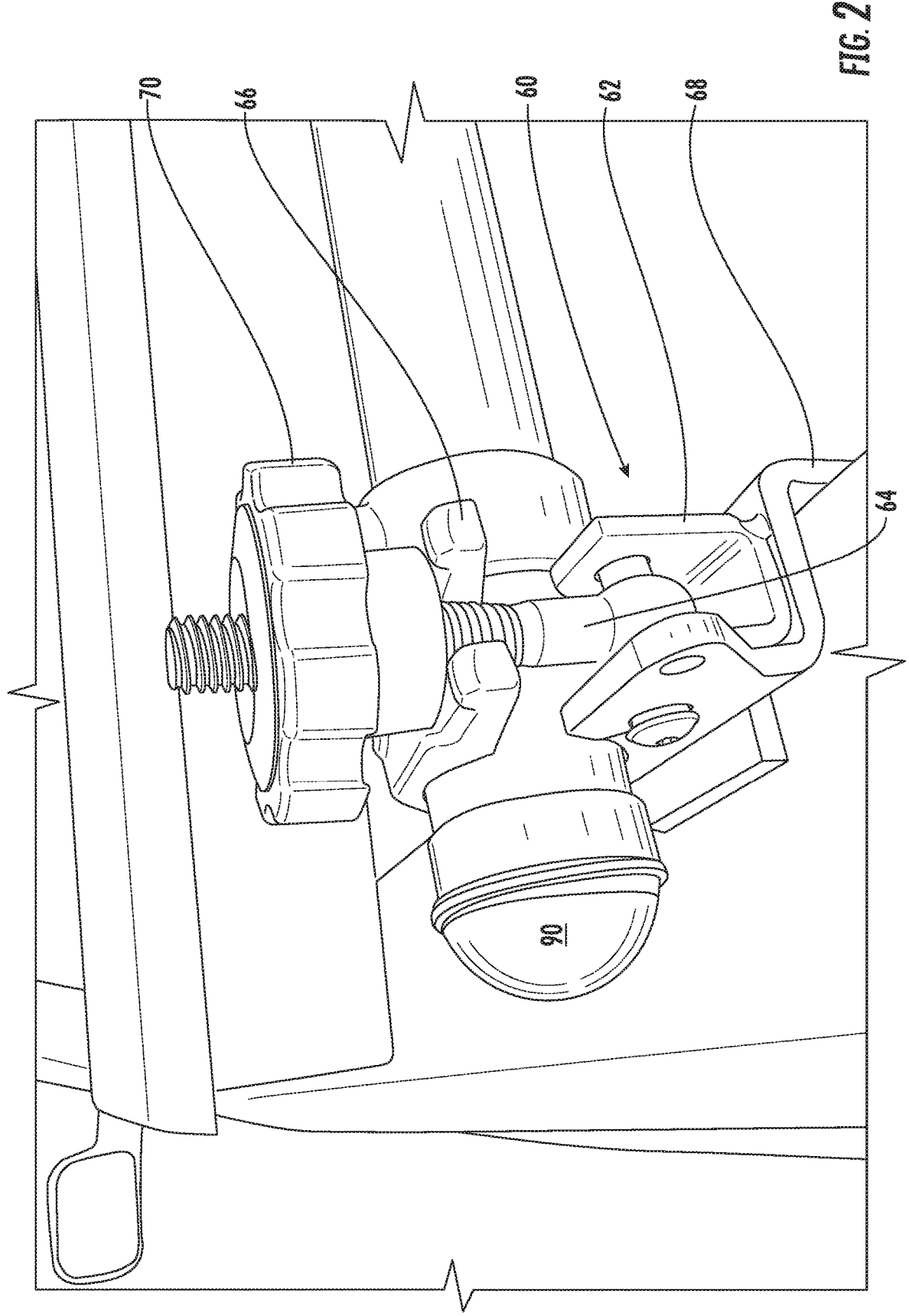
FIG. 2 is a perspective view of a first rod securement member positioning between side walls of a cargo bed of a pick-up truck.

As seen in reference to FIG. 2, rod 10 can optionally have end caps 90 placed on the terminal ends of rod 10. As illustrated the end caps 90 can be curved so as to provide for less wind resistance and noise while preventing water or insects from entering into the hollow interior of the rod 10.

As best seen in reference to FIG. 5, rod 10 can also have a retaining ring 100 placed in proximity to an inner edge of each clamp 60 so as to prevent undesired lateral movement of the rod 10 relative to the clamp members 60.

In operation, the spare tire 5, secured to rod 20, can be lifted to an elevated position when rod 20 is lifted. The lifting motion of rod 20 will rotate rod 10 within clamp 60, allowing the tire 5 to be positioned above the cargo area of the truck bed. As needed, the handle 70 can be used to adjust the amount of tension to allow rod 10 to release and also allow for additional pressure to be applied so the rod 10 can be secured in place such that rod 20 and the supported spare tire 5 is maintained in an elevated position.

When stored, the spare tire 5 can be positioned at an angle within the cargo area. When needed, the tire 5 can be moved to an elevated position to allow access and use of more of the cargo space defined by the truck bed. When needed, the spare tire 5 can be lowered unto items placed within the cargo area to help secure the cargo load.

When the spare tire is needed, the clamps 60 can be loosened and the spare tire holder 1 and spare tire 5 can be moved to the rear of the truck bed for easier access and removal of the spare tire. The optional wheel 80 facilitates the movement of the holder 1 and spare tire 5. When desired, holder 1 and spare tire 5 can be moved within the confines of the cargo bed to help secure any cargo place therein, provide for greater flexibility in terms of the use of the cargo space, and the rod 20 and spare tire 5 can also be adjusted and positioned laterally relative to support rod 10 when needed to provide for a more efficient utilization of the cargo space.

Figure 8:
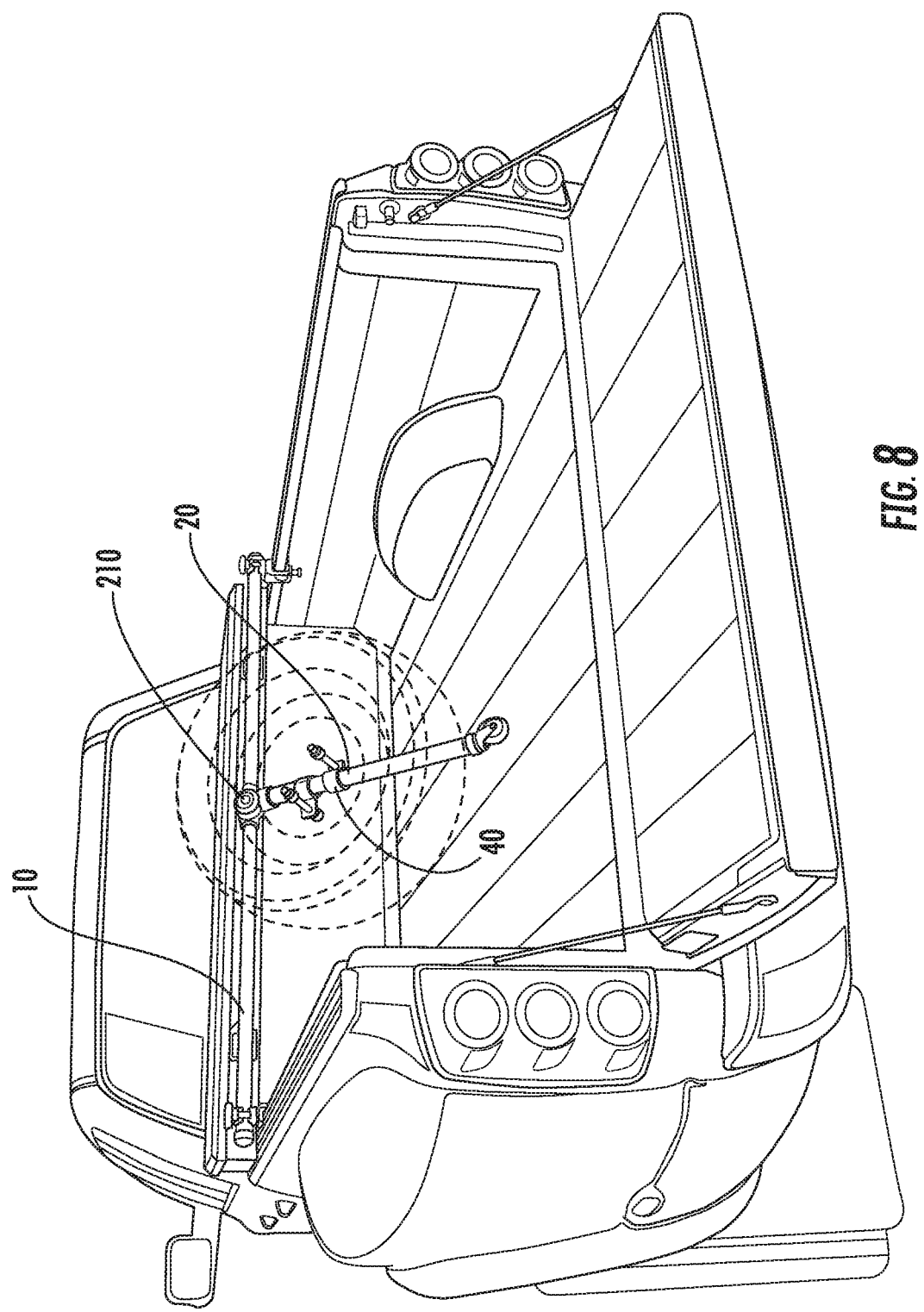
FIGS. 8-10 is a view in partial phantom of an alternative embodiment of the invention using a rotating process to elevate the spare tire in a lateral and upward direction.
Figure 9:
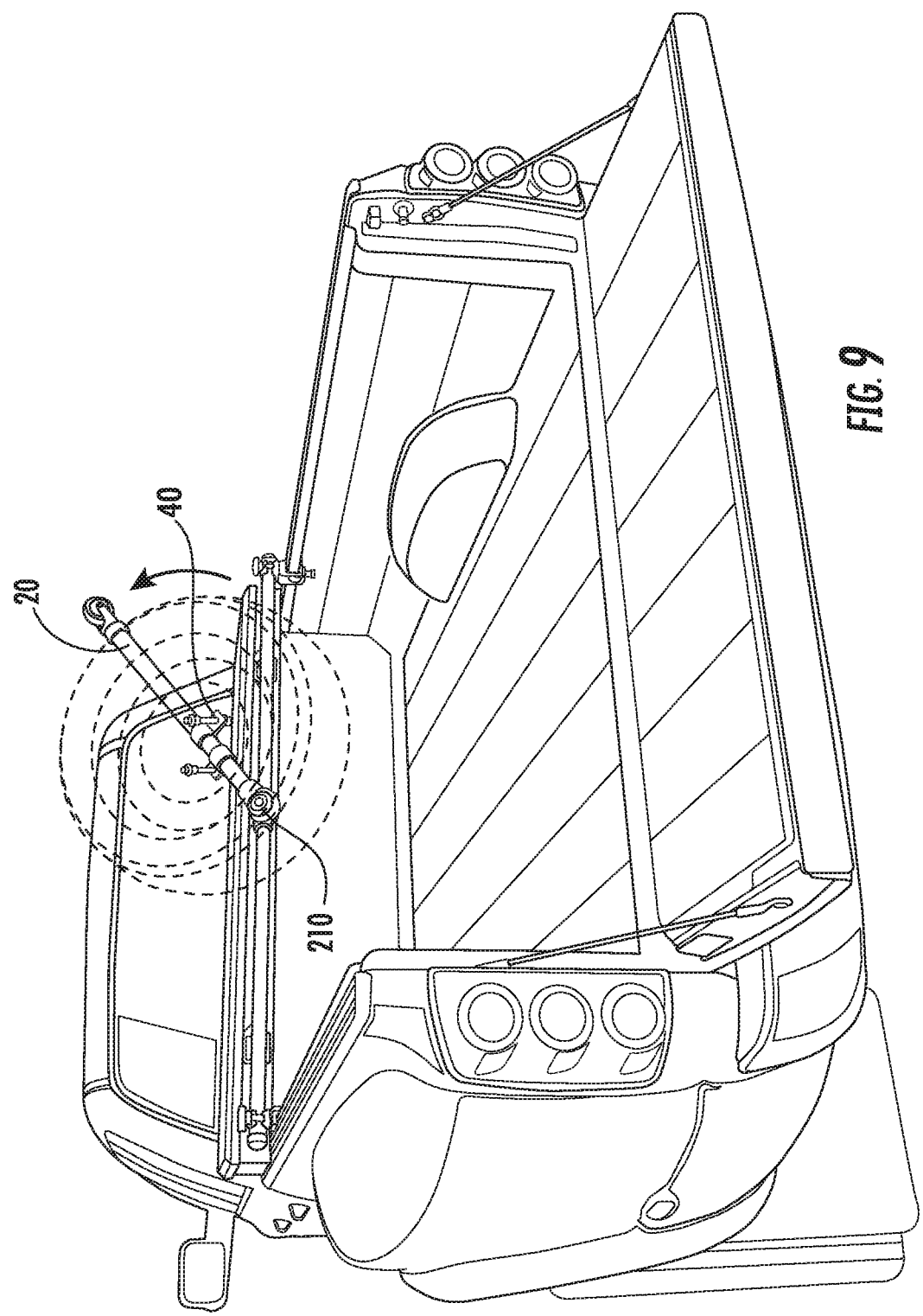
Figure 10:
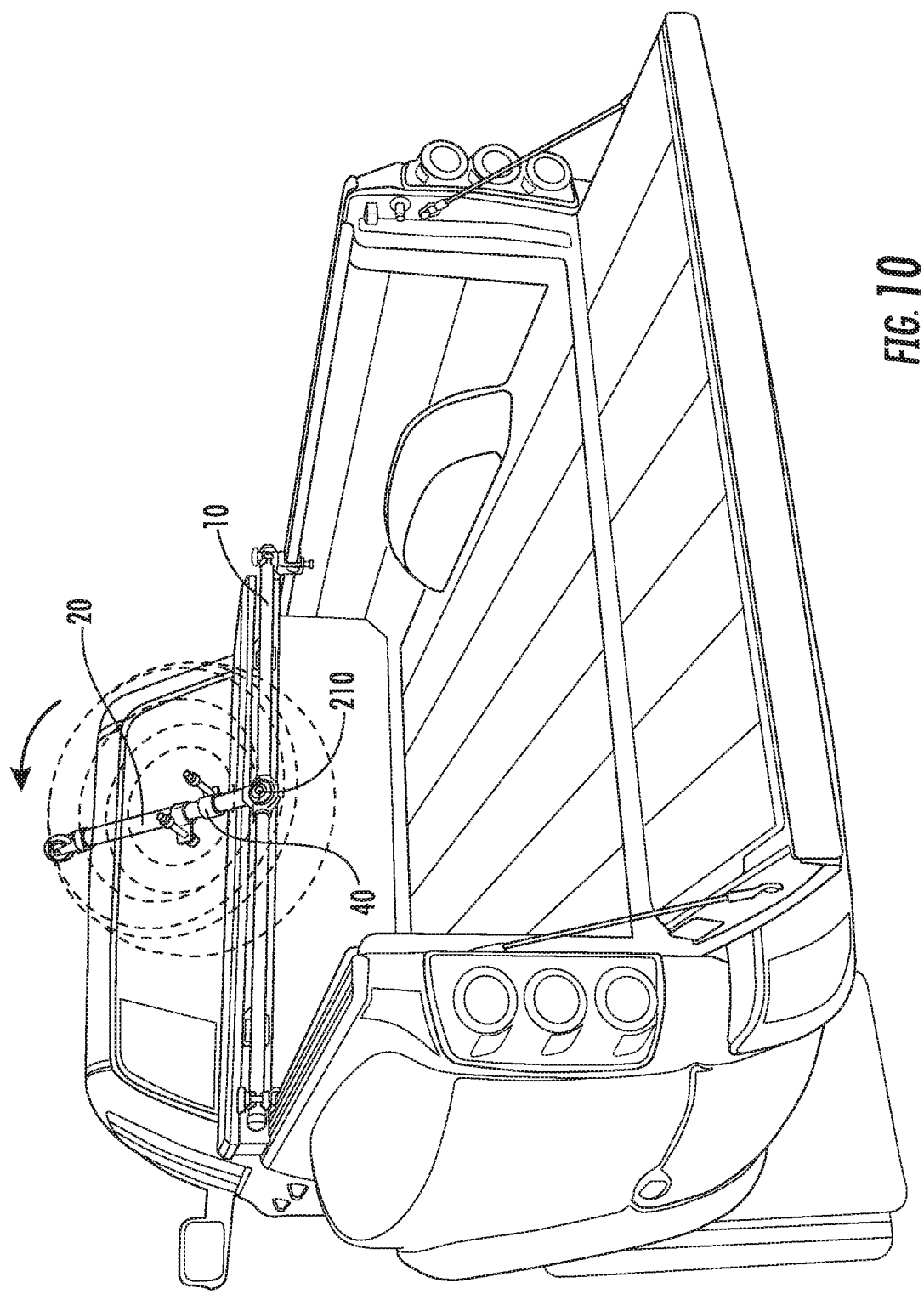

As been seen in reference to FIGS. 8-10, an alternative apparatus and process can be provided which rotates the tire laterally in reference to a rear wall of the truck bed, thereby placing the tire in an upright position to allow greater access to the storage area of the pick-up truck. As seen in FIGS. 8-10, a swivel 210 is used to interconnect rod 10 and rod 20 at a terminus of rod 20. The swivel 210 allows the spare tire to be rotated laterally as seen by the directional arrows in FIGS. 9 and 10.

Figure 11:
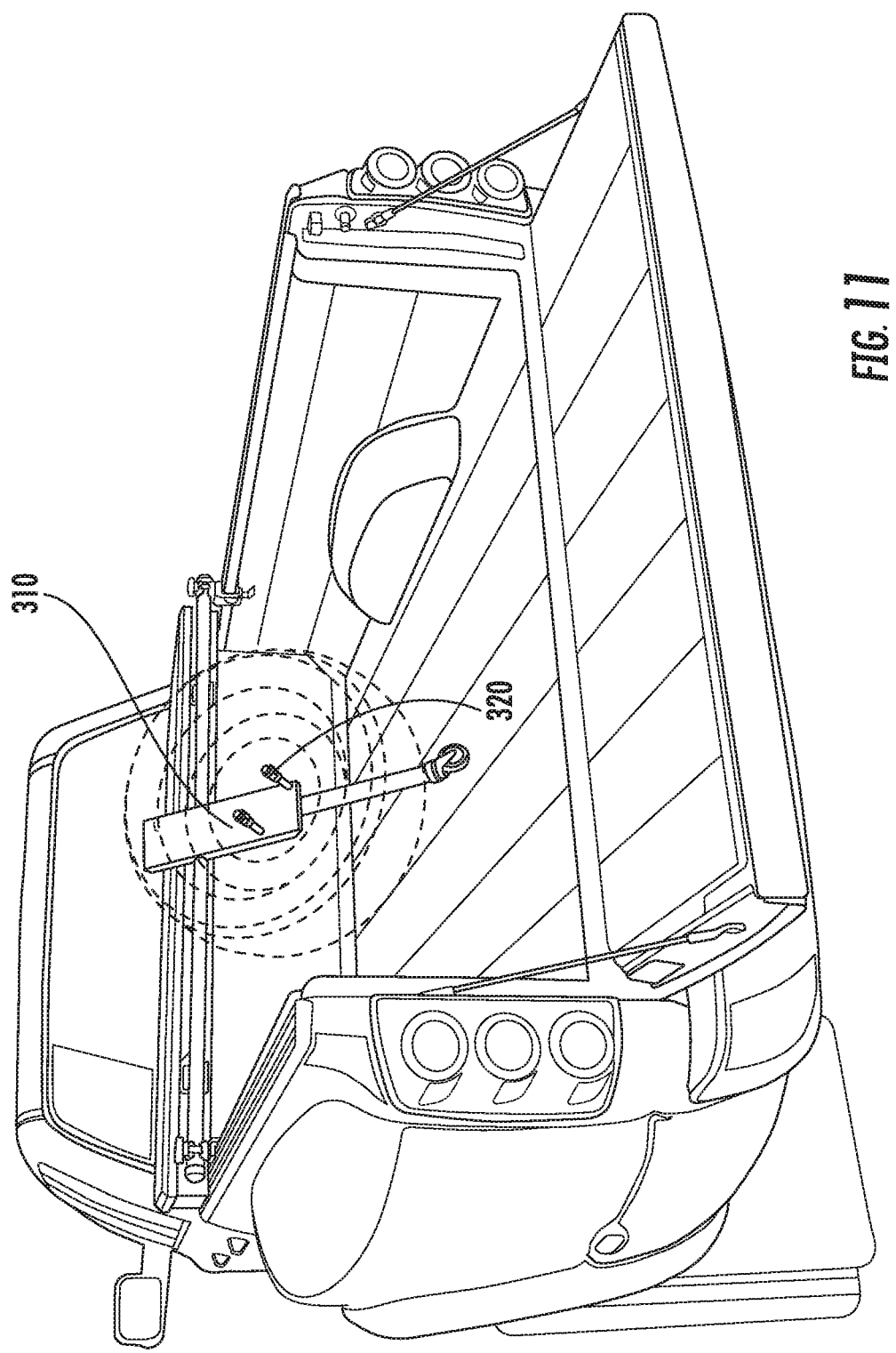
FIGS. 11 and 12 illustrate yet another alternative embodiment of a sliding mechanism in which the spare tire can be slide from a first stored position to a second elevated position.
Figure 12:
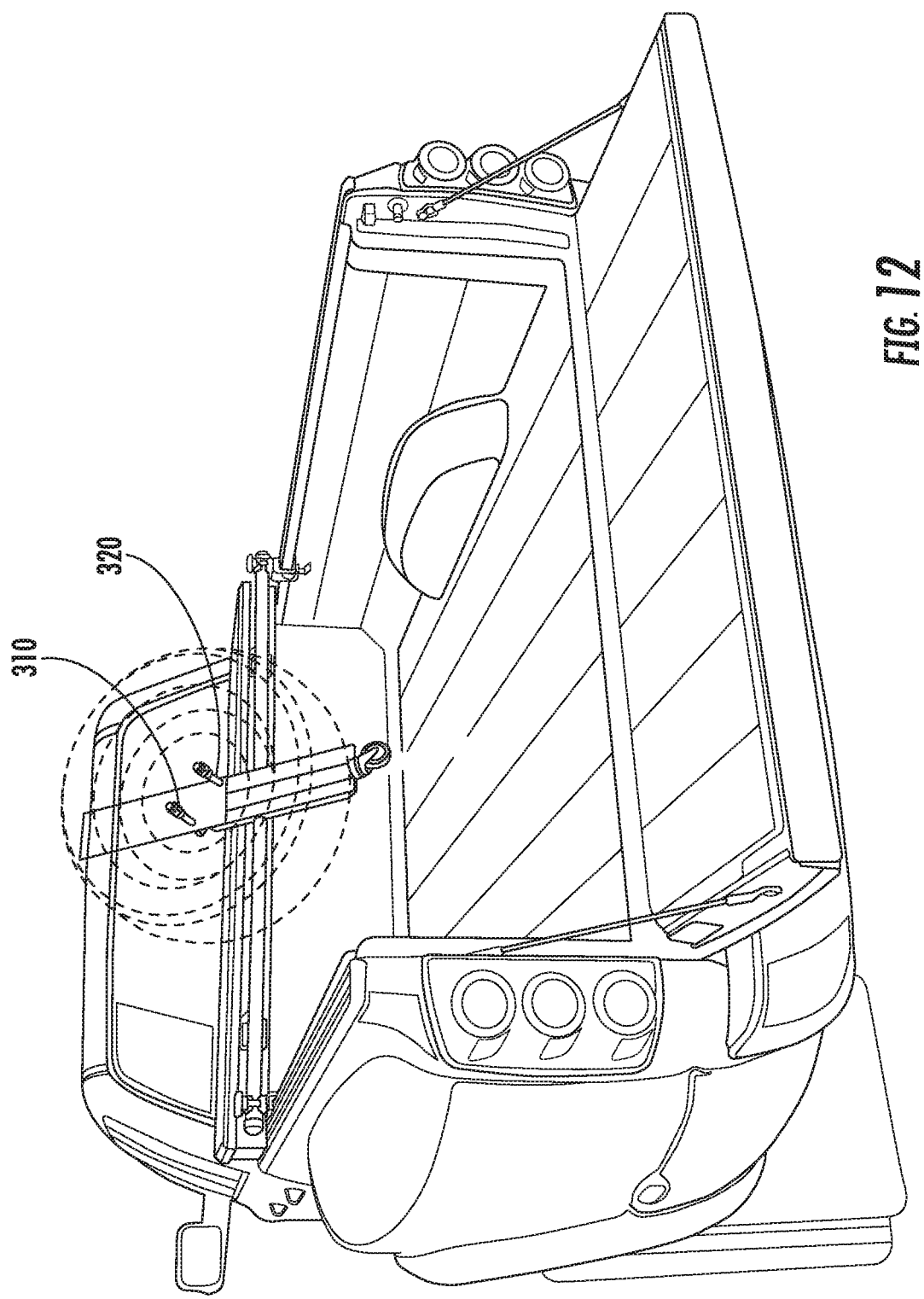

Yet another alternative embodiment can be seen in reference to FIG. 11 and FIG. 12 in which a sliding bracket 310 is used to slide the spare tire in an upward direction. Bracket 310 is adapted for holding the spare tire using retention screws 320 or other conventional hardware. The bracket 310 and associated spare tire can be slid along the inclined plane from the storage position shown in FIG. 11 to a raised position in FIG. 12 so as to provide greater access to the cargo area.

In all the illustrated embodiments, the supported spare tire can be adjusted laterally with respect to the horizontal rod 10 as needed to configure a more efficient use of the cargo bed space. The embodiments all provide for a useful process in which the spare tire can be moved from a stored position and which the spare tire holder 1 can be repositioned from a storage position in contact with the bed of the pick-up truck to a second elevated position in which the spare tire holder allows the spare tire to be lifted, rotated, slide or otherwise repositioned to a location that provides greater access to the cargo area of the pick-up truck. Further, all embodiments can provide for an optional wheeled structure along with a sliding mechanism for the horizontal rod 10 that allows the spare tire holder to moved within the bed of the pick-up truck.

In the embodiments seen in FIGS. 8-12 the spare tire is illustrated in phantom lines to provide for greater detail of the swivel 210, slide 310 and the brackets 40.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A spare tire holder for use within a cargo area of a pick-up truck comprising:
   a first support rod having a first end and a second end, the first end and the second end secured to a respective first pivot member and a second pivot member the first pivot member and the second pivot member each adapted for securing to opposite side walls of a cargo area of a pick-up truck;
   a second support rod having a first end and a second end, the second support rod first end secured to the first support rod, along a front end and a second end of the second support rod carrying a wheel wherein the second support rod is secured to the first support rod by a socket member that facilitates rotation of the second support rod in a lateral direction relative to the first support rod;
   at least one attachment member secured to the second support rod, the at least one attachment member adapted for holding a spare tire thereto;
   wherein, when the first support rod is in a horizontal configuration the first support rod can pivot within the first and second pivot members allowing the second support rod to be elevated from a first position having the wheel adjacent a floor of the cargo area to a second position wherein the second support rod and said wheel is elevated above a cargo area of the pick-up truck bed.

2. The spare tire holder according to claim 1 wherein the first pivot member and the second pivot member attached to the first support rod are secured to a respective clamping member adapted for securing to a side wall cargo area of a pick-up truck.

3. The spare tire holder according to claim 1 wherein the second support rod first end is secured to the first support rod by a third pivot member.

4. The spare tire holder according to claim 1 wherein the at least one attachment member secured to the second support rod is additionally attached to a slide that allows the spare tire to be moved to a second position above the bed of the pick-up truck.

5. A process of storing a spare tire within a cargo area of a pick-up truck comprising:
   providing a first support rod having a first end and a second end, the first end and the second end secured to a respective first pivot member and a second pivot member;
   a second support rod having a first end and a second end, the second support rod first end secured to the first support rod, along a front end a second end of the second support rod carrying a wheel wherein the second support rod is secured to the first support rod by a socket member that facilitates rotation of the second support rod in a lateral direction relative to the first support rod;
   at least one attachment member secured to the second support rod, the at least one attachment member adapted for holding a spare tire thereto;
   attaching a spare tire to the second support rod said spare tire, said second support rod defining a stored position where the tire is maintained in a non-horizontal plane relative to a floor of the truck bed;
   raising the second support rod by the pivoted rotation of the first support rod, thereby placing the spare tire to a second supported position, said second supported position being elevated above a cargo area of the pick-up truck.

6. The process according to claim 5 comprising the additional step of sliding the first support rod toward a rear of a pick-up bed while simultaneously allowing the wheel carried by the second support rod to move toward a rear of the truck bed, thereby positioning the spare tire carried by the second support rod to a tailgate portion of the truck bed whereby easier access to the spare tire can be provided.

7. A process of storing a spare tire within a cargo area of a pick-up truck comprising:
   providing a first support rod having a first end and a second end, the first end and the second end secured to a respective first pivot member and a respective second pivot member, the first pivot member and the second pivot member adapted for attaching to opposite side walls of a cargo area of a pick-up truck;

a second support rod having a first end and a second end, the second support rod first end secured to the first support rod, along a front end a second end of the second support rod carrying a wheel wherein the second support rod is secured to the first support rod by a socket member that facilitates rotation of the second support rod in a lateral direction relative to the first support rod;

at least one attachment member secured to the second support rod, the at least one attachment member adapted for holding a spare tire thereto;

attaching a spare tire to the second support rod said spare tire, said support rod defining a stored position where the tire is maintained in a non-horizontal plane relative to a floor of the truck bed;

repositioning the second support rod of the spare tire to a second supported position by the pivoted movement of the first support rod within the first pivot member and the second pivot member, said second supported position being above a cargo area of the pick-up truck.

8. The process according to claim 7 the repositioning step further provides for lifting the second rod in a perpendicular relationship to the first rod.

9. The process according to claim 7 wherein said repositioning step further defines positioning the tire in a lateral direction relative to a rear wall of a cargo area of a pick-up truck.

10. The process according to claim 7 wherein said repositioning step further includes providing a support bracket for the spare tire which can be slid along the plane of a storage position of the spare tire.

* * * * *